(12) United States Patent
Chung et al.

(10) Patent No.: US 11,289,709 B2
(45) Date of Patent: Mar. 29, 2022

(54) PEROVSKITE OXIDE CATALYST HAVING IMPROVED OXYGEN CATALYTIC ACTIVITY AND PREPARATION METHOD THEREOF

(71) Applicant: Korea Advanced Institute of Science and Technology, Daejeon (KR)

(72) Inventors: Sung Yoon Chung, Daejeon (KR); Ju Mi Bak, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 764 days.

(21) Appl. No.: 15/972,584

(22) Filed: May 7, 2018

(65) Prior Publication Data
US 2018/0331370 A1    Nov. 15, 2018

(30) Foreign Application Priority Data
May 15, 2017    (KR) ........................ 10-2017-0059937

(51) Int. Cl.
| | | |
|---|---|---|
| *C04B 35/00* | (2006.01) | |
| *H01M 4/90* | (2006.01) | |
| *C01G 53/00* | (2006.01) | |
| *H01M 4/86* | (2006.01) | |

(52) U.S. Cl.
CPC .......... *H01M 4/9033* (2013.01); *C01G 53/70* (2013.01); *C01P 2002/34* (2013.01); *C01P 2002/72* (2013.01); *C01P 2004/04* (2013.01); *C01P 2006/40* (2013.01); *H01M 2004/8689* (2013.01)

(58) Field of Classification Search
CPC ........ H01M 4/9033; H01M 2004/8689; C01G 53/70; C01P 2004/04; C01P 2002/72; C01P 2006/40; C01P 2002/34; Y02E 60/50; B01J 23/83; B01J 35/026
USPC ............................................................ 502/1
See application file for complete search history.

(56) References Cited

FOREIGN PATENT DOCUMENTS

KR    1020130123621 A    11/2013

OTHER PUBLICATIONS

Detemple et al. Ruddlesden-Popper faults in LaNiO3/LaAlO3 superlattices Journal of Applied Physics 112, 013509 (2012); https://doi.org/10.1063/1.4731249 (Year: 2012).*

Toshimasa Suzuki, Yuji Nishi & Masayuki Fujimoto (2000) Defect structure in homoepitaxial non-stoichiometric strontium titanate thin films, Philosophical Magazine A, 80:3, 621-637, DOI: 10.1080/01418610008212072 (Year: 2000).*

(Continued)

*Primary Examiner* — Haytham Soliman
(74) *Attorney, Agent, or Firm* — The Webb Law Firm

(57) ABSTRACT

Disclosed is a catalyst having a perovskite structure in the form of $ABO_3$, in which the number of ion moles at the A site has an excess ratio compared to the number of ion moles at the B site. The present invention exhibits an oxygen catalytic activity improved by about 3 times in an oxygen evolution reaction and by about 40% in an oxygen reduction reaction, compared to those of an existing $LaNiO_3$ perovskite catalyst. Further, since the metallic conductivity is not significantly changed compared to the existing $LaNiO_3$ perovskite oxide, there is an advantage in that a carbon support need not be used when the present invention is used as a catalyst in a battery positive electrode.

6 Claims, 12 Drawing Sheets

(56) References Cited

OTHER PUBLICATIONS

Detemple et al. "Polarity-driven nickel oxide precipitation in LaNiO3—LaAlO3 superlattices" Appl. Phys. Lett. 99, 211903 (2011); https://doi.org/10.1063/1.3663568 (Year: 2011).*
Bockris et al., "The Electrocatalysis of Oxygen Evolution on Perovskites", Journal of Electrochemical Society, 1984, pp. 290-302, vol. 131.
Petrie et al., "Enhanced Bifunctional Oxygen Catalysis in Strained LaNiO3 Perovskites", J. Am. Chem. Soc., 2016, pp. 2488-2491, vol. 138.
Suntivich et al., "A Perovskite Oxide Optimized for Oxygen Evolution Catalysis from Molecular Orbital Principles", Science, 2011, pp. 1383-1385, vol. 334.
Suntivich et al., "Design principles for oxygen-reduction activity on perovskite oxide catalysts for fuel cells and metal-air batteries", Nature Chemistry, 2011, pp. 546-550, vol. 3.
Bak et al., "Formation of Two-Dimensional Homologous Faults and Oxygen Electrocatalytic Activities in a Perovskite Nickelate", Nano Letters, 2017, pp. 3126-3132, vol. 17.
Coll et al., "Simulation of STEM-HAADF Image Contrast of Ruddlesden—Popper Faulted LaNiO3 Thin Films", The Journal of Physical Chemistry, 2017, pp. 9300-9304, vol. 121.
Peña et al., "Chemical Structures and Performance of Perovskite Oxides", Chem. Rev., 2001, pp. 1981-2017, vol. 101.
Singh et al., "Influence of LaNiO3 Shape on Its Solid-Phase Crystallization into Coke-Free Reforming Catalysts", ACS Catalysis, 2016, pp. 4199-4205, vol. 6.

\* cited by examiner

PEROVSKITE OXIDE CATALYST HAVING IMPROVED OXYGEN CATALYTIC ACTIVITY AND PREPARATION METHOD THEREOF

CROSS-REFERENCE TO RELATED APPLICATION

This application claims priority to Korean Patent Application No. 10-2017-0059937 filed May 15, 2017, the disclosure of which is incorporated in its entirety by reference.

Technical Field

The present invention relates to a perovskite oxide catalyst having an improved oxygen catalytic activity, and more particularly, to a perovskite oxide catalyst having an improved oxygen catalytic activity through faults formed on the surface of the catalyst, and a preparation method thereof.

Background Art

In general, $ABO_3$ (A: a lanthanum-series positive ion, M: a trivalent 3d transition metal positive ion)-type perovskite oxides are used as catalysts for an oxygen evolution reaction and an oxygen reduction reaction while the B site becomes an active site.

Depending on the type of transition metal ion of the B site of a perovskite catalyst, the physical • chemical characteristics thereof vary, and the catalytic activity thereof also varies. Accordingly, it may be an important problem to find a method capable of synthesizing a more efficient perovskite catalyst while the structure thereof is equally maintained.

Existing methods are limited to finding a configuration having the highest activity by simply changing atoms at the A site and the B site of a perovskite oxide or mixing various kinds of atoms in order to improve the oxygen catalytic activity.

However, even though a catalytic reaction actually takes place on the two-dimensional surface of a catalyst, the core explanations of most of the study results explains the overall performance of the bulk of electronic structures and atomic arrangement situations as they are.

Most of the currently disclosed methods of synthesizing various perovskite oxide catalysts are limited to a synthesizing method for increasing a surface area per unit mass in the form of powder. Materials in the form of powder have a problem in that a surface on which a catalytic reaction takes place is not easily observed due to a random orientation of the crystal structure of the surface.

Currently, disclosed are perovskite oxides in which the composition ratio of Co and Mn positioned at the B site in a perovskite structure $ABO_3$ is changed or the compositions of metal ions of the A site and the B site each consist of one or more elements, and the like.

Meanwhile, various studies have been conducted on an inexpensive highly-efficient catalyst based on oxides, phosphorus oxides, and the like in order to replace a noble metal catalyst based on expensive platinum used in the related art as a catalyst for oxygen evolution and reduction reactions. The article by J. O'M. Bockris & T. Otagawa, The Electrocatalysis Of Oxygen Evolution on Perovskites, *Journal of the Electrochemical Society* 131, 290-302 (1984), published a study result in which when an oxygen evolution reaction takes place on the surface of a perovskite catalyst, the catalytic activity varies depending on the bonding intensity between a transition metal at the B site and an oxygen atom.

In the article by J. Suntivich et al., A Perovskite Oxide Optimized for Oxygen Evolution Catalysis from Molecular Orbital Principles, *Science* 334, 1383-1385 (2011), the oxygen evolution reaction catalytic activity of an $LaMO_3$ (M: a trivalent 3d transition metal positive ion) perovskite in an aqueous alkali solution was studied, and it was confirmed that when the number of $e_g$ electrons of the transition metal ion at the B site is close to 1, the $LaMO_3$ perovskite had higher catalytic activity than that of $IrO_2$ used as an existing catalyst for an oxygen evolution reaction. However, since a catalyst having high catalytic activity, such as $Ba_{0.5}Sr_{0.5}Co_{0.8}Fe_{0.2}O_3$, has considerably low stability, there is a problem because the catalyst is not suitable as a catalyst.

In the article by J. Suntivich et al., Design Principles for Oxygen-Reduction Activity on Perovskite Oxide Catalysts for Fuel Cells and Metal Air Batteries, *Nature Chemistry* 3, 546-550 (2011), the catalytic activity of an oxygen reduction reaction of an $LaMO_3$ (M: a trivalent 3d transition metal positive ion) perovskite was confirmed, and it was confirmed that when $Ni^{3+}$, $Co^{3+}$, and $Mn^{3+}$, of which the number of $e_g$ electrons is 1, are present at the B site, the $LaMO_3$ perovskite had high activity close to that of a catalyst based on platinum.

The previous three articles simply suggest an oxide having the highest catalytic activity by changing the type of transition metal positioned at the B site of a perovskite oxide, and indices capable of showing the same.

Meanwhile, in a recently published article by J. R. Petrie et al., Enhanced Bifunctional Oxygen Catalysis in Strained $LaNiO_3$ Perovskites, *Journal of the American Chemical Society* 138, 2488-2491 (2016), the catalytic activity for oxygen evolution and reduction reactions was studied according to the type of strain imposed due to the lattice parameter difference by growing a $LaNiO_3$ thin film on various single crystal substrates using a PLD method, but there is a disadvantage in that the $LaNiO_3$ thin film can be affected by strain only when the thin film has a very small thickness (~10 nm).

Studies have been continuously conducted on various kinds of perovskite oxides as an inexpensive oxide catalyst which replaces an expensive noble metal catalyst as described above, and preparation methods thereof, and furthermore, studies for enhancing catalytic activity and stability have been continuously conducted.

SUMMARY OF THE INVENTION

The present invention has been made in an effort to provide a perovskite oxide catalyst in which faults are formed on the surface of the catalyst by a method of changing a ratio of the numbers of moles of the A site and B site elements, instead of a method of substituting a part or both of the A site and the B site in a perovskite oxide $ABO_3$ with other elements as in the related art, and the oxygen catalytic activity is improved through the formed faults.

An exemplary embodiment of the present invention provides a catalyst having a perovskite structure in the form of $ABO_3$, in which the number of ion moles at the A site has an excess ratio compared to the number of ion moles at the B site.

A and B may be lanthanum (La) and nickel (Ni), respectively.

The excess ratio may be 2 to 10 mol %.

The catalyst having the perovskite structure may have a stacking fault.

The stacking fault may be a fault formed by continuously facing an $[LaO]^+$ layer and an $[LaO]^+$ layer with each other.

The stacking fault may be present at a ratio of 10 to 15% based on a total unit cell of a perovskite compound.

The stacking fault may be formed in a thin film of the perovskite compound and on a surface thereof.

The catalyst having the perovskite structure may have a current density of 120 to 125 µA/cm² at 1.63 V (vs. RHE).

Another exemplary embodiment of the present invention provides a method for preparing a catalyst having a perovskite structure in the form of $ABO_3$, the method including: washing a substrate; preparing a sol-gel solution such that La is mixed at an excess ratio compared to Ni; preparing an $LaNiO_3$ thin film by applying the sol-gel solution onto the substrate; and subjecting the $LaNiO_3$ thin film to a heat treatment.

The excess ratio may be 2 to 10%.

The present invention exhibits an oxygen catalytic activity improved by about 3 times in an oxygen evolution reaction and by about 40% in an oxygen reduction reaction, compared to those of an existing $LaNiO_3$ perovskite catalyst.

Since the metallic conductivity is maintained compared to the existing $LaNiO_3$ perovskite oxide, there is an advantage in that a carbon support need not be used when the present invention is used as a catalyst in a battery positive electrode.

However, effects which a perovskite oxide catalyst having an improved oxygen catalytic activity and a preparation method thereof according to exemplary embodiments of the present invention can achieve are not limited to those mentioned above, and the other effects not mentioned will be clearly understood by a person with ordinary skill in the art to which the present invention pertains from the following description.

BRIEF DESCRIPTION OF THE DRAWINGS

The accompanying drawings included as a part of the detailed description to assist understanding of the present invention provide exemplary embodiments of the present invention and explain the technical spirit of the present invention along with the detailed description.

DETAILED DESCRIPTION

Figure 1:
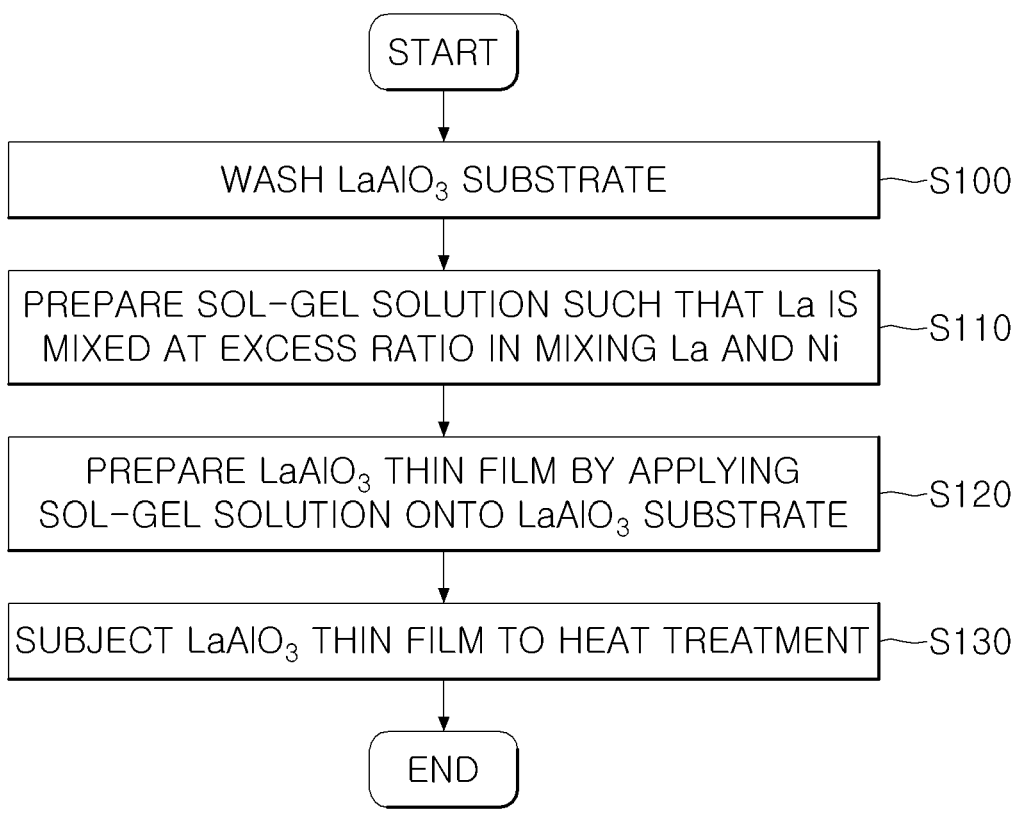
FIG. 1 is a flowchart illustrating a method for preparing a perovskite oxide catalyst according to the present invention.

The terms or words used in the present specification and the claims should not be construed as being limited as typical or dictionary meanings, and should be construed as meanings and concepts conforming to the technical spirit of the present invention on the basis of the principle that an inventor can appropriately define concepts of the terms in order to describe his or her own invention in the best way. Accordingly, since the exemplary embodiments described in the present specification and the configurations illustrated in the drawings are only the most preferred exemplary embodiment of the present invention and do not represent all of the technical spirit of the present invention, it is to be understood that various equivalents and modified examples, which may replace the exemplary embodiments and the configurations, are possible at the time of filing the present application. Hereinafter, a perovskite oxide catalyst having an improved oxygen catalytic activity according to an exemplary embodiment of the present invention and a preparation method thereof will be described in detail with reference to the accompanying drawings.

FIG. 1 is a flowchart illustrating a method for preparing a perovskite oxide catalyst according to the present invention.

The present invention exhibits a high oxygen catalytic activity appearing in the case of a composition in which the number of moles of trivalent positive ions positioned at the A site in a perovskite oxide having a chemical formula of $ABO_3$ is present in excess by 2 to 10 mol % compared to the number of moles of trivalent positive ions positioned at the B site.

As an example, faults are formed on the surface of the catalyst by varying a ratio of La and Ni in a $LaNiO_3$ oxide known as an amphoteric catalyst of oxygen evolution and reduction reactions, and the catalytic activity may be improved through the formation faults.

A process of preparing $LaNiO_3$, to which La is added in excess, according to the present invention includes: washing a $LaAlO_3$ substrate (S100); preparing a sol-gel solution such that La is mixed at an excess ratio compared to Ni (S110); preparing a $LaNiO_3$ thin film by applying the sol-gel solution onto the $LaAlO_3$ substrate (S120); and subjecting the $LaNiO_3$ thin film to a heat treatment (S130).

The washing of the $LaAlO_3$ substrate (S100) includes ultrasonically treating the $LaAlO_3$ substrate sequentially with tertiary distilled water, acetone, and ethanol for 10 minutes each and subjecting the $LaAlO_3$ substrate to a heat treatment at 400° C. for 30 minutes.

The preparing of the sol-gel solution such that La is mixed at an excess ratio compared to Ni (S110) includes using $La(NO_3)_3 \cdot 6H_2O$ (lanthanum nitrate hexahydrate) and $Ni(CH_3COO)_2 \cdot 4H_2O$ (nickel acetate tetrahydrate) as precursors to dissolve the precursors in 2-methoxyethanol such that La is present at an excess ratio of 2 to 10 mol % with respect to Ni and refluxing the dissolved solution at 80° C. for about 1 hour.

The preparing of the LaNiO$_3$ thin film by applying the sol-gel solution onto the LaAlO$_3$ substrate includes applying the prepared sol-gel solution onto the washed LaAlO$_3$ substrate as applying the thin film by using a spin coater. In this case, the sol-gel solution is applied at a rate of 3,500 to 4,000 rpm for about 10 seconds.

The subjecting of the LaNiO$_3$ thin film to the heat treatment (S130) includes drying the thin film prepared through Step S120 at about 150° C. for about 10 minutes, thermally decomposing the thin film at about 400° C. for about 10 minutes, and then subjecting the thin film to a heat treatment at about 700° C. for about 10 minutes.

A method for synthesizing the LaNiO$_3$ thin film by using a sol-gel spin coating method which is one of the chemical solution deposition methods is used. By adjusting a ratio of the numbers of moles of La and Ni when preparing a sol-gel solution which is a precursor for synthesizing a thin film, the density of stacking faults formed in the thin film may be adjusted, and thus the catalytic activity may be maximized, and the surface of the crystal having a predetermined orientation is easily observed. Further, since the thin film is prepared by a simple process, materials for the thin film may be mass-produced.

When a thin film is prepared by using, as a precursor, a sol-gel solution in which La at the A site is present in excess by about 2 to 10 mol % compared to Ni at the A site, a stacking fault in which an [LaO]$^+$ layer and an [LaO]$^+$ layer face each other is formed in the thin film and on the surface thereof. The stacking fault causes a change in the micro structure of existing perovskite. Since a sol-gel solution is used as a precursor in the method for synthesizing a catalyst, which is used in the present invention, unlike the PLD in which a bulk target is used, the ratio of the numbers of moles of La and Ni is easily adjusted, and accordingly, the density of faults formed in the thin film can also be adjusted.

In the present invention, materials for a thin film grown in a predetermined direction on a single crystal substrate are used instead of using powdered materials. Effects of faults formed on the surface of the material for the catalyst on the crystal structure and the changes in structure before and after the catalytic reaction were directly identified through a transmission electron microscope, and the catalytic reaction and the activation were maximized by adjusting faults at the atomic level on the 2 dimensional surface through the identification.

Figure 2:
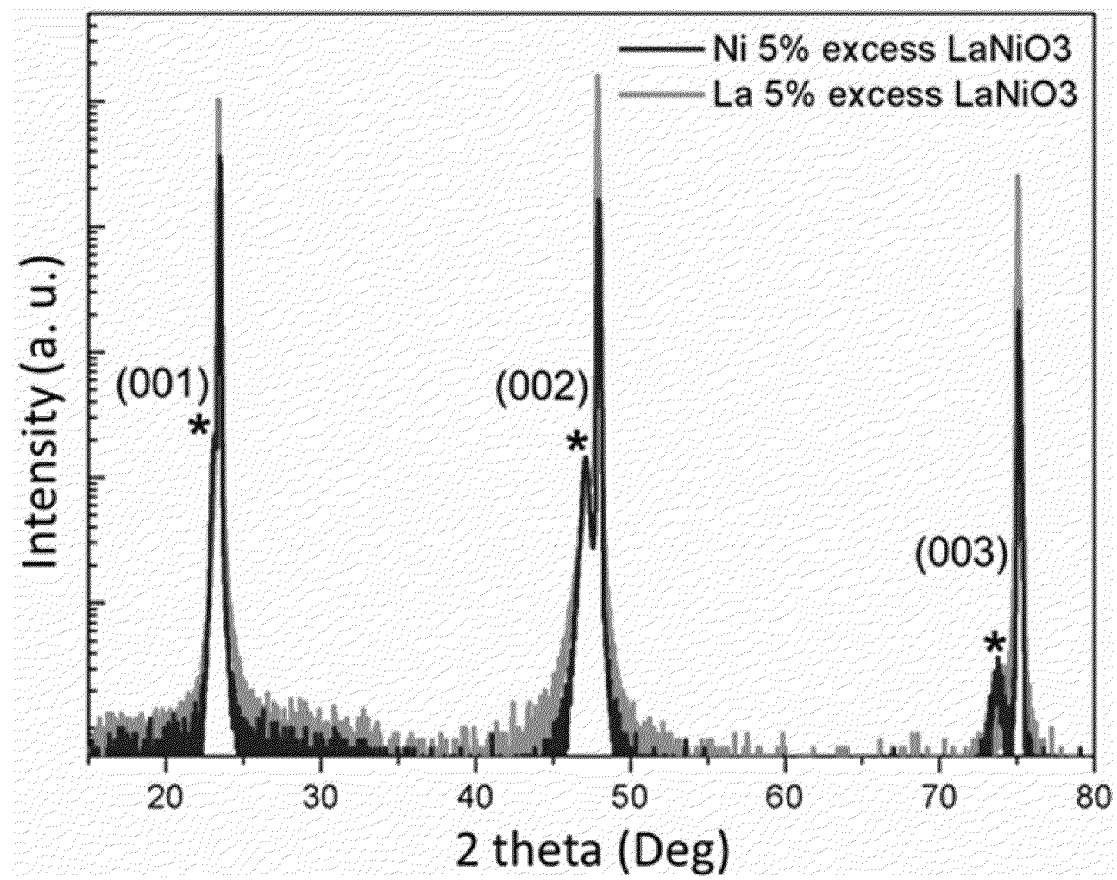
FIG. 2 illustrates XRD patterns of an $LaNiO_3$ thin film applied on an $LaAlO_3$ substrate.

FIG. 2 illustrates XRD patterns of a LaNiO$_3$ thin film applied on a LaAlO$_3$ substrate.

Referring to the XRD graph in FIG. 2, it can be confirmed that in both the case where Ni is present in excess compared to La and the case where La is present in excess compared to Ni, the LaNiO$_3$ thin film is grown in the same direction of LaAlO$_3$. The LaAlO$_3$ substrate is a single crystal substrate having a (001) direction, showing that the (001), (002), and (003) peaks of LaAlO$_3$, which are shown highly in the graph, are single crystals in the (001) direction.

In FIG. 2, the shoulder peak represented by an asterisk (*) at the left side of each peak of LaAlO$_3$ indicates a LaNiO$_3$ thin film grown in the same direction, and through FIG. 2, it may be confirmed that an epitaxial thin film may be synthesized on a single crystal substrate by a sol-gel spin coating method.

Figure 3A:
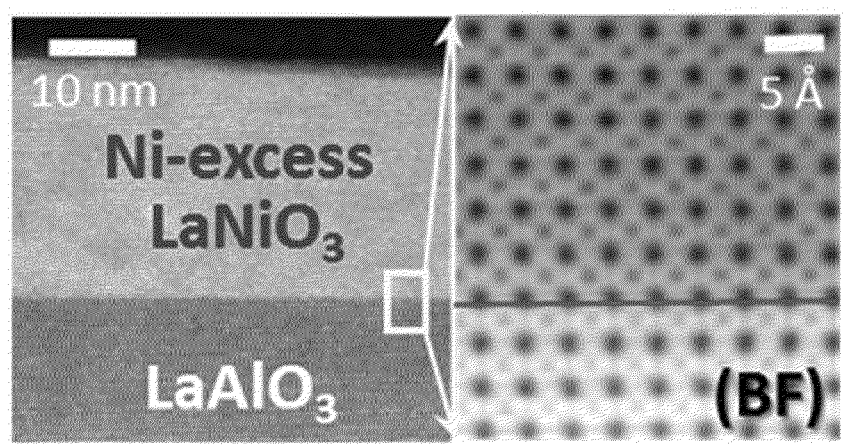
FIG. 3A is a scanning transmission electron microscope (STEM) image of a cross-section of a $LaNiO_3$ thin film to which La applied on a $LaAlO_3$ substrate is added in excess.
Figure 3B:
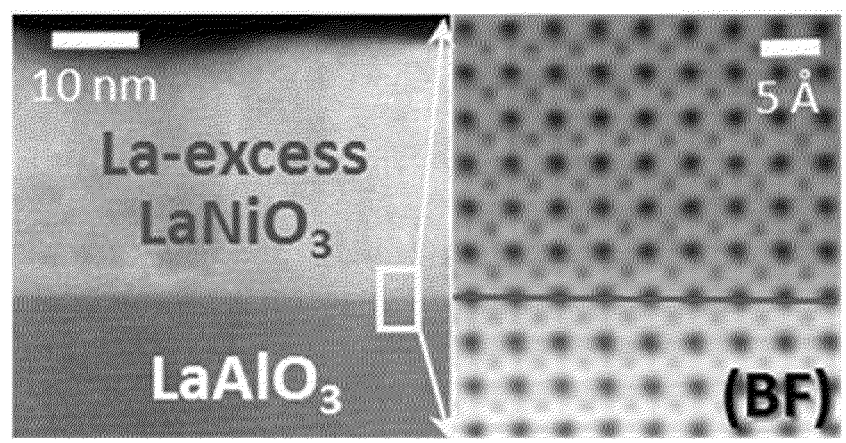
FIG. 3B is a STEM image of a cross-section of a $LaNiO_3$ thin film to which Ni applied on a $LaAlO_3$ substrate is added in excess.

FIG. 3A is a scanning transmission electron microscope (STEM) image of a cross-section of a LaNiO$_3$ thin film to which La applied on a LaAlO$_3$ substrate is added in excess, and FIG. 3B is a STEM image of a cross-section of a LaNiO$_3$ thin film to which Ni applied on a LaAlO$_3$ substrate is added in excess.

Through the annular bright-field (ABF)-STEM image illustrated in FIG. 3, it can be confirmed that both the LaNiO$_3$ thin film to which La is added in excess and the LaNiO$_3$ thin film to which Ni is added in excess are grown in the same direction of LaAlO$_3$ substrate.

Figure 4A:
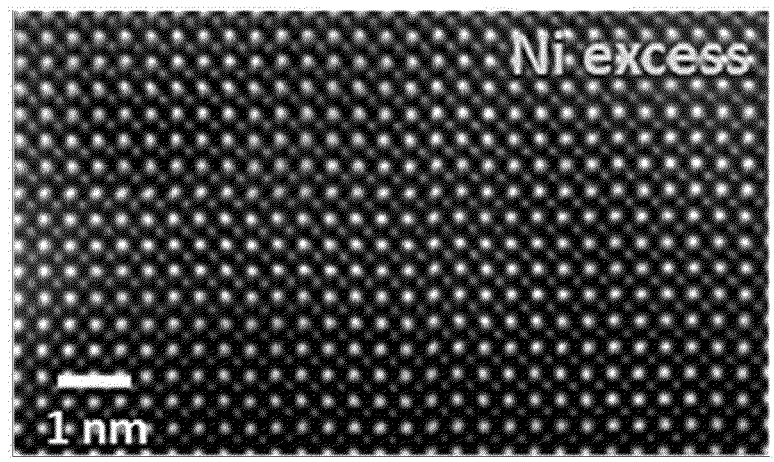
FIG. 4A is a STEM image of cross-sections of $LaNiO_3$ in which Ni is present in excess compared to La and FIG. 4B is a magnified STEM image of the cross-section of $LaNiO_3$ in which La is present in excess compared to Ni.
Figure 4B:
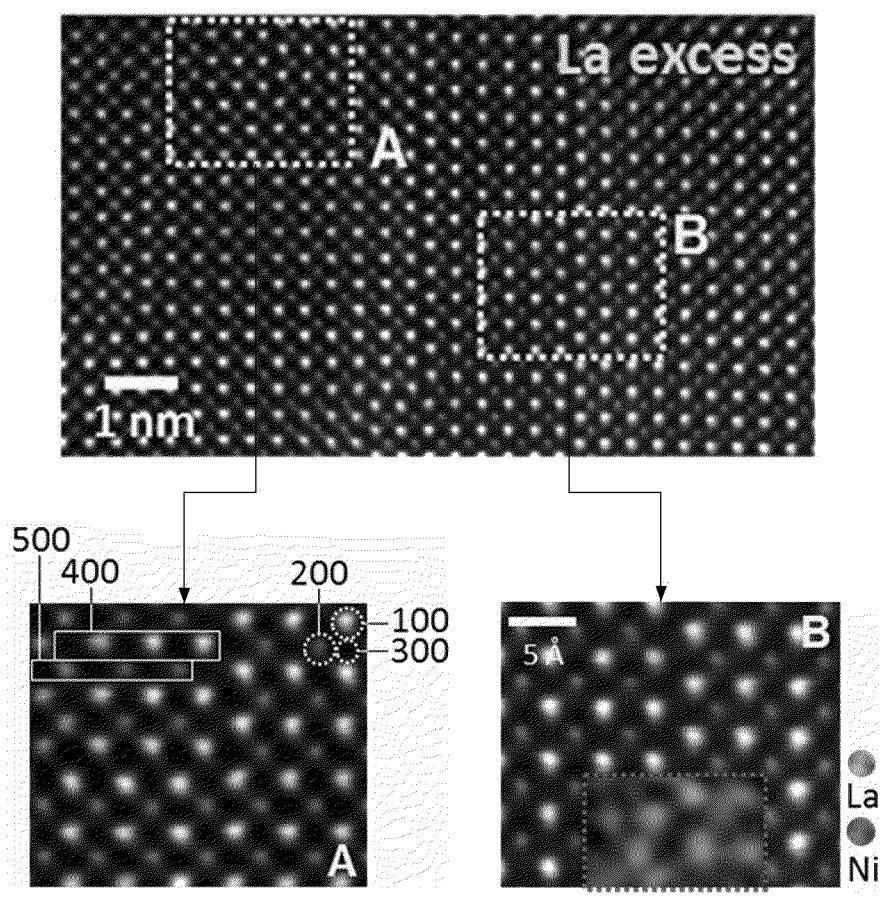
Figure 5A:
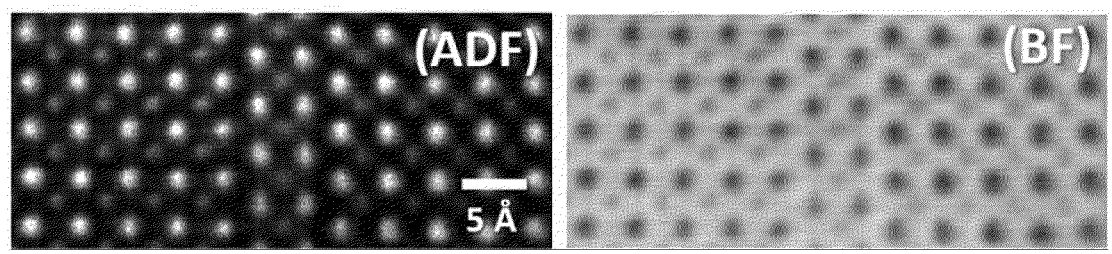
FIGS. 5A, 5B, 5C, and 5D are STEM images illustrating various Ruddlesden-Popper (RP) faults formed in a $LaNiO_3$ thin film in which La is present in excess.
Figure 5B:
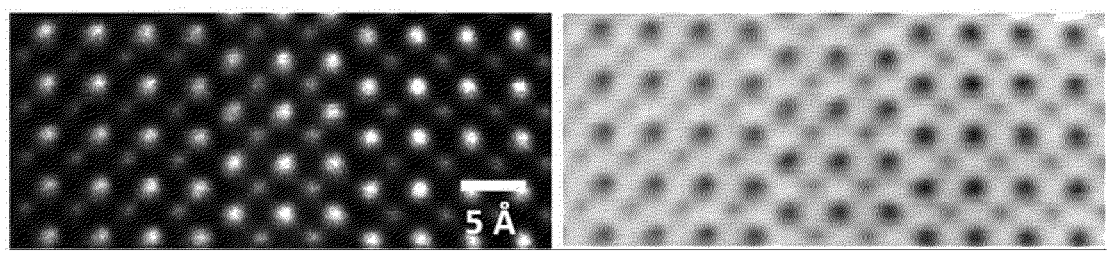
Figure 5C:
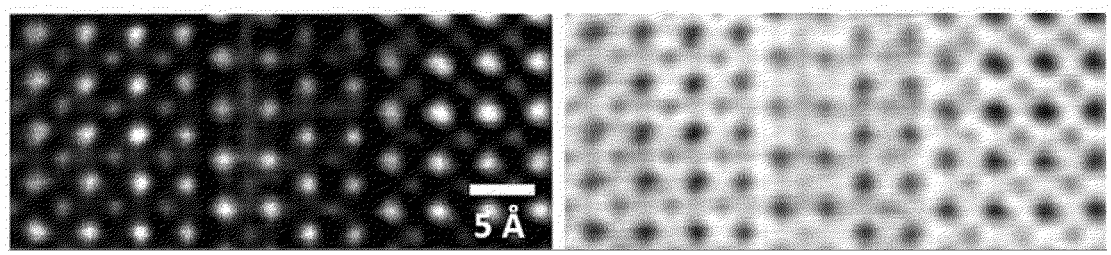
Figure 5D:
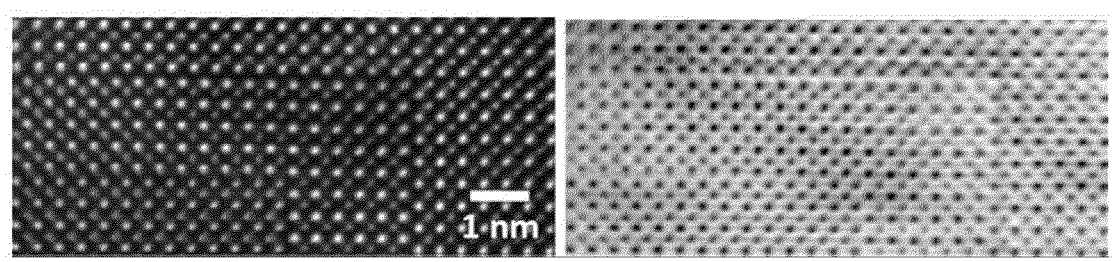

FIG. 4A is a STEM image of the cross-sections of LaNiO$_3$ in which Ni is present in excess compared to La and FIG. 4B is a magnified STEM image of the cross-section of LaNiO$_3$ in which La is added at an excess ratio compared to Ni.

Basically, from the viewpoint of the layer-by-layer structure, an ABO$_3$ perovskite oxide consists of [AO] and [BO$_2$] layers. Accordingly, in the case of LaNiO$_3$, both La and Ni are trivalent positive ions, so that the ABO$_3$ perovskite oxide consists of layers having electric charges of [LaO]+ and [NiO$_2$]−.

Referring to FIG. 4A, it can be confirmed that in LaNiO$_3$ to which Ni is added at an excess ratio compared to La, an [LaO]$^+$ layer 400 consisting of La 100 and O 300 and an [NiO$_2$]$^-$ layer 500 consisting of Ni 200 and O 300 are alternately stacked.

In contrast, referring to FIG. 4B which is an image of LaNiO$_3$ to which La is added at an excess ratio compared to Ni, it can be confirmed that a faulty structure in which the [LaO]$^+$ layer 400 and the [LaO]$^+$ layer 400 are stacked is formed instead of a form in which the [LaO]$^+$ layer 400 and the [NiO$_2$]$^-$ layer 500 are stacked. The structure of the stacking fault can be identified in detail through a magnified image of the A region and the B region illustrated in FIG. 4B.

That is, in the LaNiO$_3$ perovskite structure, when seen from the [100] axis direction, it is common that the [LaO]$^+$ layer and the [NiO$_2$]$^-$ layer are sequentially and alternately stacked, but when La is added in excess compared to Ni as in the present invention, a form of stacking fault in which a [LaO]$^+$ layer comes after a [LaO]$^+$ layer is generated. In the present specification, the form of stacking fault in which the [LaO]$^+$ layer is positioned after the [LaO]$^+$ layer is called an RP fault. The aforementioned RP fault is formed in a form where an entire arrangement of perovskite layers is inserted while being interrupted in the middle.

FIGS. 5A, 5B, 5C, and 5D are STEM images illustrating various RP faults formed in a LaNiO$_3$ thin film in which La is present in excess.

Referring to FIG. 5, it was confirmed that stacking faults in various forms from a fault consisting of a single [LaNiO$_3$] layer (FIG. 5A) to a block form (FIG. 5D) are formed. In order to more quantitatively show the oxygen catalytic activity which stacking faults bring about, the number of unit cells of stacking faults in the STEM image of the La-excess LaNiO$_3$ thin film was measured. Through the analyzed STEM image, it was confirmed that about 350 stacking fault unit cells were present in about 3,000 unit cells. As a result, it was confirmed that a 10 to 15% [NiO$_6$] octahedral structures on average was changed.

Figure 6:
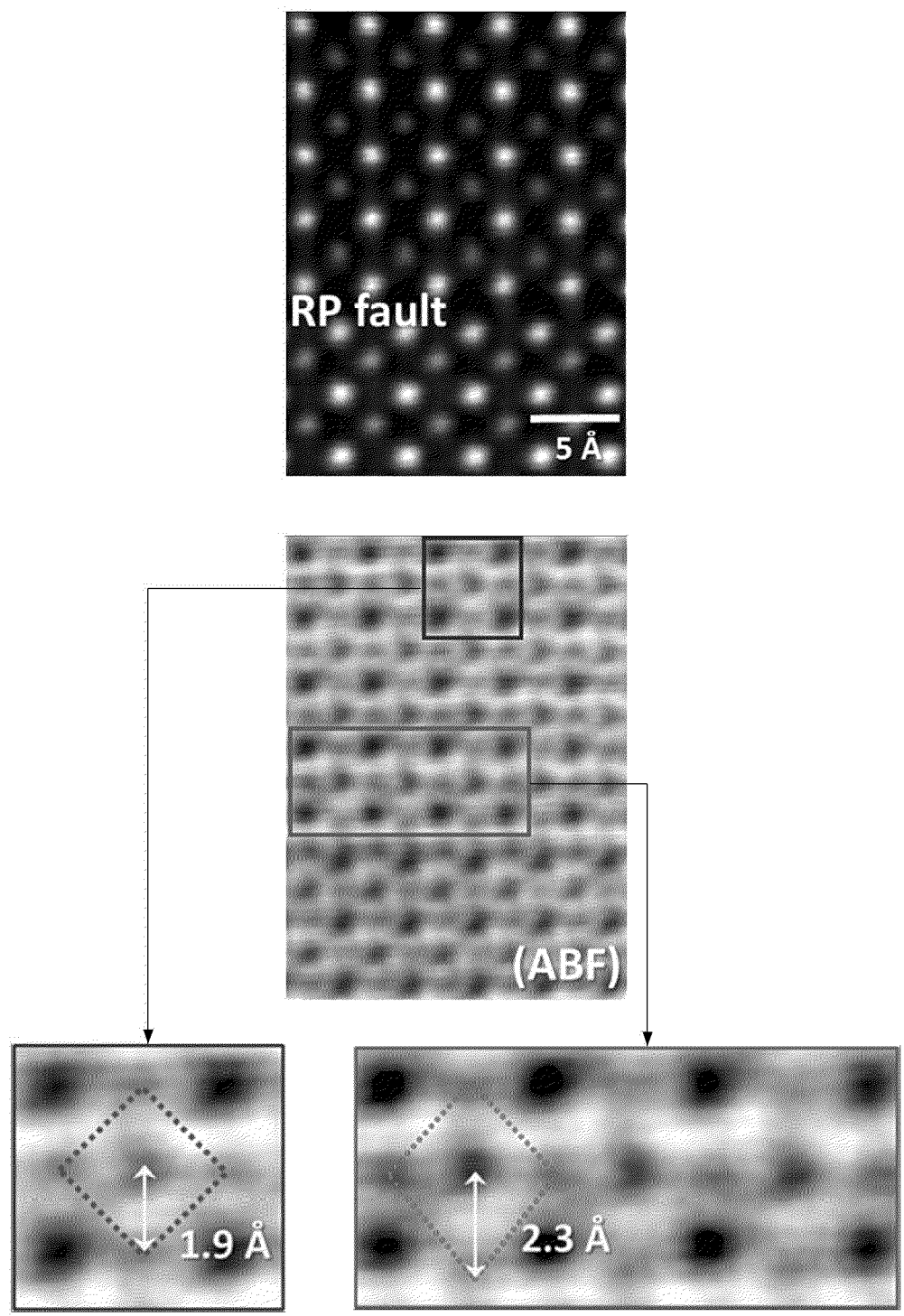
FIG. 6 is a STEM image of comparing bonding lengths of Ni—O according to the presence and absence of stacking fault.

FIG. 6 is a STEM image of comparing bonding lengths of Ni—O according to the presence and absence of stacking fault.

When the RP fault is formed, it can be confirmed that the structure of the [NiO$_6$] octahedral is considerably elongated unlike the existing perovskite. When the RP fault is formed, it can be confirmed that the octahedron (red square) present in the fault is considerably elongated in a z-axis direction compared to the octahedron (blue square) present inside the bulk. It was confirmed that the Ni—O bonding length was only 1.9 Å in the bulk, but 2.3 Å increased by about 20% in the fault. The change in octahedral structure as described above was also identified through a discrete Fourier transform (DFT) calculation.

Figure 7A:
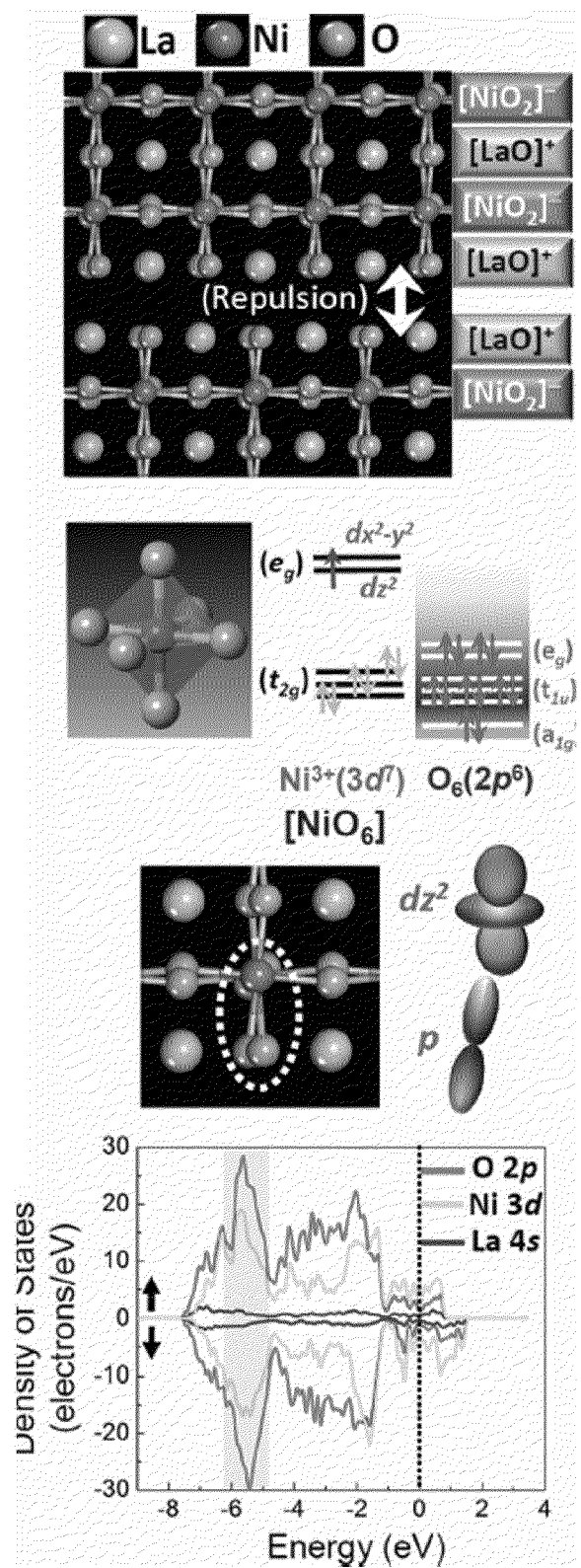
FIGS. 7A and 7B illustrate a process in which a structure of a $[NiO_6]$ octahedron is changed due to the formation of stacking fault, and a change in energy level caused by the process.
Figure 7B:
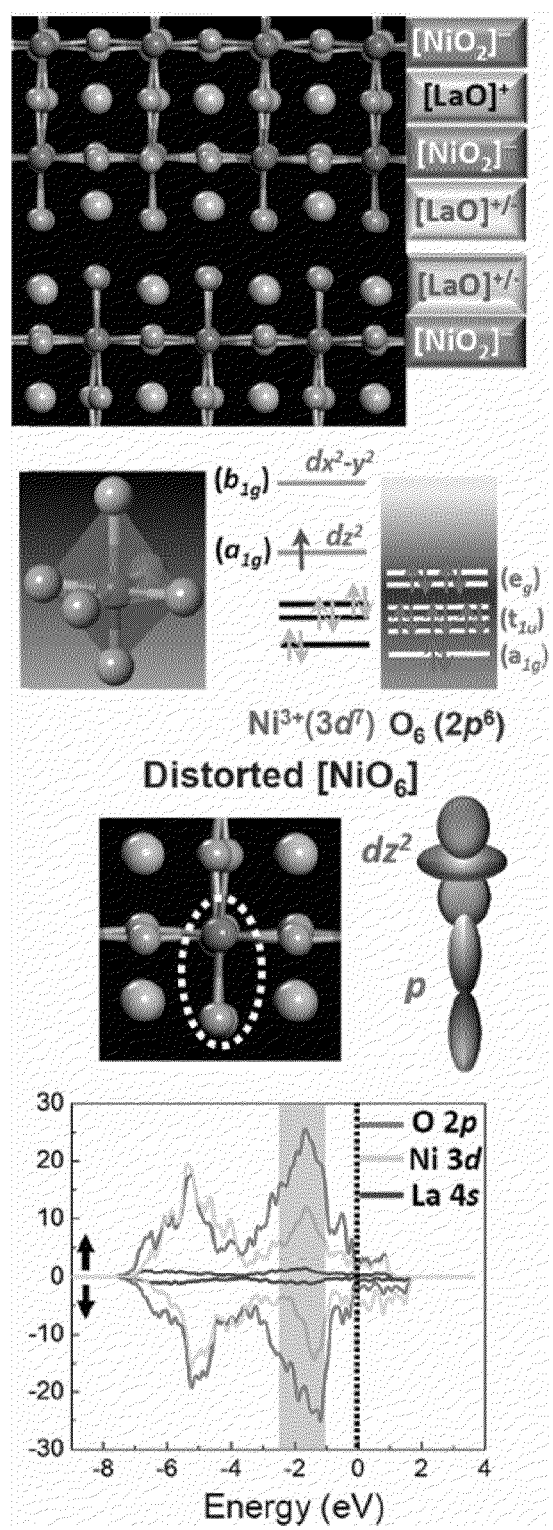

FIGS. 7A and 7B illustrate a process in which a structure of a [NiO$_6$] octahedron is changed due to the formation of stacking fault, and a change in energy level caused by the process.

When the [LaO]$^+$ layers are formed to face each other by the formed stacking faults as in FIG. 7A, a positively charged interlayer repulsive force is produced. Accordingly, in order to minimize the repulsive force, oxygen atoms present in the stacking fault deviate in a layer direction where the faults are formed, and as a result, a change in structure of the [NiO$_6$] octahedron occurs (FIG. 7B). The aforementioned change in structure of the transition metal octahedron is accompanied by a change in energy level of electrons.

As illustrated in FIG. 7B, when the bonding length of Ni—O is elongated in the z-axis direction, the splitting of the e$_g$ energy level of the d orbital is generated according to the Jahn-Teller theorem, and as the energy level of dz$^2$ is lowered, the d orbital overlaps with the 2p orbital of O much more, and thus, electric charges are easily transferred. The DFT calculation result illustrated at the lowest portion of FIG. 7 supports the fact.

Figure 8A:
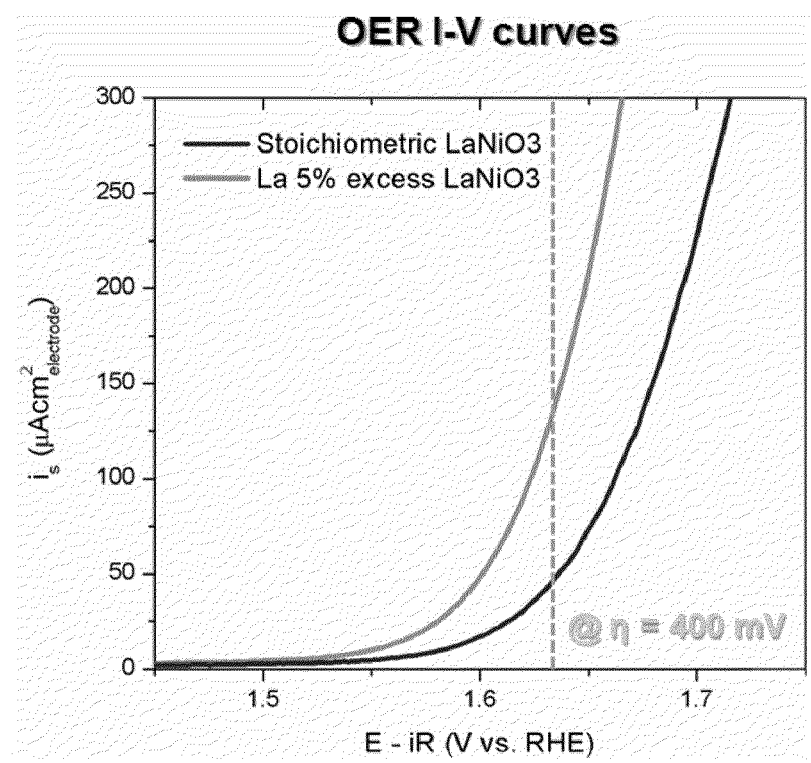
FIGS. 8A and 8B are oxygen evolution reaction and oxygen reduction reaction current-voltage curves of $LaNiO_3$ in which Ni is present at an excess ratio compared to La and $LaNiO_3$ in which La is present at an excess ratio compared to Ni.
Figure 8B:
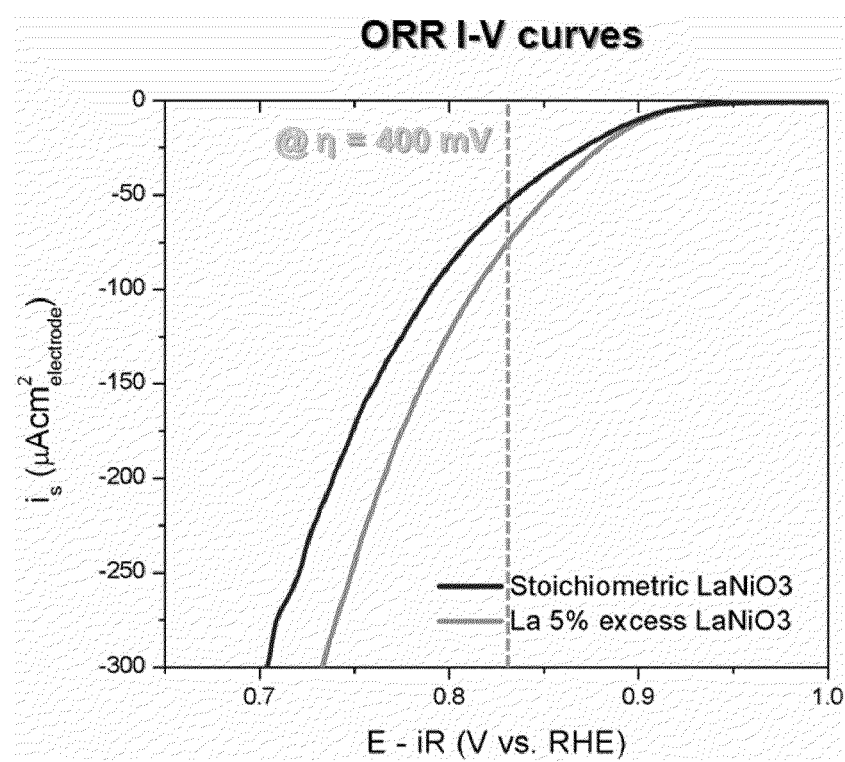

FIGS. 8A and 8B are oxygen evolution reaction and oxygen reduction reaction current-voltage curves of LaNiO$_3$ in which Ni is present at an excess ratio compared to La and LaNiO$_3$ in which La is present at an excess ratio compared to Ni.

Referring to FIG. 8A, it can be seen that at a point where the overvoltage is 400 mV (1.63 V vs. RHE), a La-excess LaNiO$_3$ thin film exhibits a higher current density than an Ni-excess LaNiO$_3$ thin film having no RP faults.

Referring to FIG. 8B, it can be seen that at a point where the overvoltage is 400 mV (0.83 V vs. RHE), a La-excess LaNiO$_3$ thin film exhibits a higher current density than an Ni-excess LaNiO$_3$ thin film.

Specifically, it can be confirmed that a LaNiO$_3$ catalyst in which La is present in excess by 5 mol % exhibits an oxygen catalytic activity improved by about 3 times (42 μA/cm$^2$→121 μA/cm$^2$, η=400 mV) in an oxygen evolution reaction and by about 40% (−54 μA/cm$^2$→−78 μA/cm$^2$, η=400 mV) in an oxygen reduction reaction, compared to an existing LaNiO$_3$ perovskite catalyst.

Figure 9:
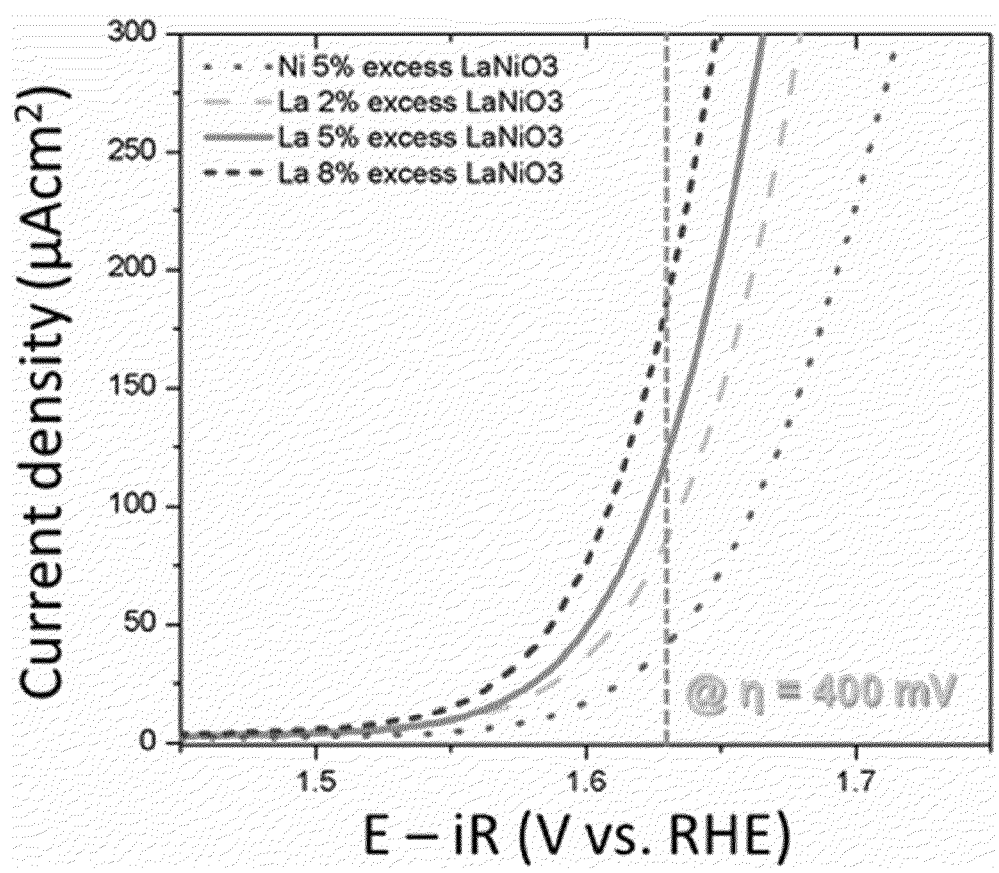
FIG. 9 illustrates an oxygen evolution reaction current-voltage curve of $LaNiO_3$ according to the ratio of La added in excess.

FIG. 9 illustrates an oxygen evolution reaction current-voltage curve of LaNiO$_3$ according to the ratio of La added in excess.

At a point where the overvoltage was 400 mV (1.63 V vs. RHE), when La was present in excess by 2%, when La was present in excess by 5%, and when La was present in excess by 8%, the measured current densities were 87 μA/cm$^2$, 121 μA/cm$^2$, and 185 μA/cm$^2$, respectively. Meanwhile, when Ni was added in excess, the measured current density was 42 μA/cm$^2$. It could be confirmed that the case where La was added in excess compared to Ni had a current density increased two times or more the case where La and Ni were added at the same ratio.

Figure 10:
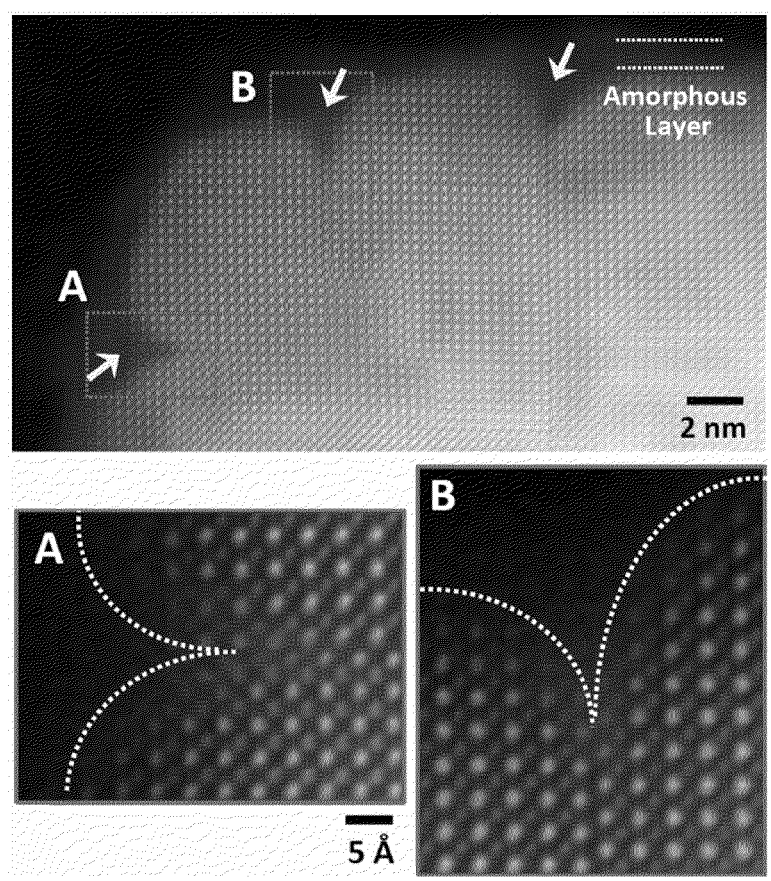
FIG. 10 is a STEM image illustrating a surface of a thin film in which the oxygen evolution reaction is completely measured in an overvoltage region.

FIG. 10 is a STEM image illustrating a surface of a thin film in which the oxygen evolution reaction is completely measured in an overvoltage region.

In order to confirm that the RP fault is an active site in an oxygen evolution reaction, an amorphous layer was formed on the surface of the thin film by artificially applying an overvoltage as high as 1.9 V (vs. RHE). As a result, it was confirmed that at a surface portion having RP faults, the amorphous layer was more rapidly formed than at a surface portion having no RP faults. Through this, it could be confirmed that the RP fault was an active site in an oxygen evolution reaction.

Representative exemplary embodiments of the present invention have been described in detail, but it is to be understood by a person with ordinary skill in the art to which the present invention pertains that the above-described exemplary embodiments may be variously modified without departing from the scope of the present invention. Therefore, the right scope of the present invention should not be defined as being limited to the described exemplary embodiments, and should be defined by not only the claims to be described below, but also those equivalent to the claims.

What is claimed is:

1. A catalyst for the evolution and reduction of oxygen, the catalyst comprising a perovskite structure in a form of ABO$_3$,
    wherein the number of ion moles at the A site has an excess ratio compared to the number of ion moles at the B site and the perovskite structure has a stacking fault that acts as an active site for oxygen generation, and
    wherein A and B are lanthanum (La) and nickel (Ni), respectively, and the perovskite structure is provided as a film on a LaAlO$_3$ substrate.

2. The catalyst of claim 1, wherein the excess ratio is 2 to 10%.

3. The catalyst of claim 1, wherein the stacking fault is a fault formed by continuously facing a [LaO]$^+$ layer and a [LaO]$^+$ layer with each other.

4. The catalyst of claim 1, wherein the stacking fault is present at a ratio of 10 to 15% based on a total unit cell of a perovskite compound.

5. The catalyst of claim 1, wherein the stacking fault is formed in a thin film of the perovskite compound and on a surface thereof.

6. The catalyst of claim 1, wherein the catalyst having the perovskite structure has a current density of 120 to 125 μA/cm$^2$ at 1.63 V (vs. RHE).

* * * * *